US006202727B1

(12) United States Patent
Yisha et al.

(10) Patent No.: US 6,202,727 B1
(45) Date of Patent: Mar. 20, 2001

(54) REGISTRATION SYSTEM FOR VARIOUS TYPES OF MEDIA

(75) Inventors: Richard W. Yisha, Strongsville; John L. Lathem, Fairview Park; Dennis F. Leonard, Parma; Arthur Zimmerman, Bay Village, all of OH (US)

(73) Assignee: Zing-Pac, Ltd., Aurora, OH (US)

( * ) Notice: Subject to any disclaimer, the term of this patent is extended or adjusted under 35 U.S.C. 154(b) by 0 days.

(21) Appl. No.: 08/859,683

(22) Filed: May 20, 1997

Related U.S. Application Data

(63) Continuation-in-part of application No. 08/650,861, filed on May 20, 1996, now abandoned, and a continuation-in-part of application No. 08/749,593, filed on Nov. 15, 1996.

(51) Int. Cl.[7] .................................................... B32B 31/00

(52) U.S. Cl. ...................... 156/538; 156/308.4; 156/310; 156/324

(58) Field of Search .................................... 156/643, 459, 156/510, 516, 538, 543, 285, 306.3, 308.4, 310, 324; 118/724, 725, 665, 722, 723, 712

(56) References Cited

U.S. PATENT DOCUMENTS 4,271,757 * 6/1981 Maxwell et al. ...................... 101/37
4,930,766 * 6/1990 Garauuso ............................ 711/220
5,261,961 * 11/1993 Takasu et al. ....................... 118/722
5,661,093 * 8/1997 Ravi et al. .......................... 438/763
5,812,245 * 9/1998 Goodhill et al. ...................... 315/97

FOREIGN PATENT DOCUMENTS 0297231 1/1989 (EP) .
0369639 5/1990 (EP) .

OTHER PUBLICATIONS

Patent abstracts of Japan, vol. 1998, No. 04, Mar. 31, 1999, Japan 09 330667.

Patent abstracts of Japan, vol. 1998, No. 11, Sep. 30, 1998, Japan 10173391.

Patent abstracts of Japan, vol. 1998, No. 08, Jun. 10, 1998, Japan 10075087.

* cited by examiner

*Primary Examiner*—Merrick Dixon
(74) *Attorney, Agent, or Firm*—Arter & Hadden LLP

(57) ABSTRACT

A printing system having a registration system for use with a variety of different types of media. The printing system is suitable for use with labels (with gaps or I-marks), continuous plastic (with I-marks), and bags (with perforations). The printing system includes a system for registering perforations (30) including a vacuum probe (34), vacuum sensor (36) and detection circuitry (38) to detect perforations. The printing system also includes a system for registering contrasting I-marks (10) appearing on a transparent media.

16 Claims, 5 Drawing Sheets

REGISTRATION SYSTEM FOR VARIOUS TYPES OF MEDIA

RELATED APPLICATIONS

This is a continuation-in-part Ser. No. 08/650,861 filed on May 20, 1996, abandoned and Ser. No. 08/749,593 filed Nov. 15, 1996, now pending.

FIELD OF THE INVENTION

The present invention relates generally to a printing system, and more particularly to a printing system which has a selective registration system for various types of media.

BACKGROUND OF THE INVENTION

The need often arises to print onto a variety of different types of media, including labels (e.g., thermal transfer labels and direct thermal labels), continuous plastic, and perforated bags. Labels may be adhered to a label backing paper with a small gap between each individual label (i.e., die cut stock). Alternatively, the labels may take the form of a single continuous sheet of paper adhered to a label backing paper. A printed "I-mark" located on the back side of the label backing paper is provided to indicate where individual labels are to be cut from the single continuous sheet. The I-mark typically takes the form of a contrasting mark (e.g., an opaque printed mark). It should also be noted that the label stock may take the form of a continuous sheet of paper adhered to a label backing paper, but without any I-mark. In this case no registration is done. The continuous plastic is typically transparent or colored plastic arranged on a roll. An I-mark is provided on the continuous plastic to indicate where the plastic sheet is to be cut and separated into individual pieces. The perforated bags are typically transparent plastic bags arranged on a roll. The perforations are provided to separate individual bags from the roll. Accordingly, the perforations also indicate the beginning and end location of each bag on the roll.

It should be appreciated that the gaps, I-marks and perforations are important to indicate a reference position for the media. In this regard, registration of the reference position allows a printing system to determine a fixed position on the media. Thus, printing can be initiated at a predetermined position on each label, plastic sheet, or bag relative to the reference position indicated by the gap, I-mark, or perforation.

A typical prior art printing system includes a pair of optical sensors for detecting gaps between labels and detecting an I-mark printed on the back of the label backing paper. An IR emitter is provided to emit light toward the label backing paper. The first optical sensor is a transmissive sensor for detecting the amount of light passing through the label backing paper to determine when a gap is present. The second optical sensor is a reflective sensor for detecting the change in reflectance to determine when a printed I-mark is present. Light traveling through the label backing paper is sensed by the transmissive sensor, while light reflected by the label backing paper is sensed by the reflective sensor. It should be understood that the amount of light sensed by the transmissive sensor will increase when a gap is present or there is an absence of media, while the amount of light sensed by the reflective sensor will decrease when an I-mark is present.

One drawback to the foregoing prior art printing system is that in the I-mark detection operating mode the system uses the reflective sensor to detect an I-mark, while simultaneously using the transmissive sensor to detect an "out-of-paper" condition (i.e., the absence of media). Accordingly, when the transmissive sensor detects an increase in the level of light passing through the media, it detects an "out-of-paper" condition, which causes printing to halt. The "out-of-paper" condition indicates that there is no remaining media to print upon, and that print operations should be halted. Therefore, when clear continuous plastic is run through the printing system, the printer will detect an "out-of-paper" condition, since the transmissive sensor will detect the high level of light passing through the clear continuous plastic. Therefore, prior art printing systems of this type are not suitable for printing on clear continuous plastic.

Another drawback to the prior art printing system is that it is not capable of registering perforations. Accordingly, the prior art printing system is not suitable for printing on a media having perforations, such as plastic bags arranged on a roll and separated by perforations.

SUMMARY OF THE INVENTION

It is an object of the present invention to provide a printing system which is suitable for printing on different types of media, including labels (e.g., thermal transfer labels and direct thermal labels), continuous plastic, and perforated bags.

It is another object of the present invention to provide a printing system which registers gaps, I-marks and perforations.

It is still another object of the present invention to provide a printing system which provides a unique, efficient and inexpensive system for registering gaps, I-marks and perforations.

It is still another object of the present invention to provide a printing system having power rewind and unwind system for positioning a media for printing thereupon.

It is yet another object of the present invention to provide a printing system having a tension control system for maintaining tension on a media to be printed upon.

It is yet another object of the present invention to provide a printing system which allows printing on multiple types of media, registration of the multiple types of media, and which can be implemented through simple modifications of existing printing systems.

Still other objects and advantages and benefits of the present invention will become apparent to those skilled in the art upon a reading and understanding of the following detailed description of a preferred embodiment taken together with the accompanying drawings and the appended claims.

BRIEF DESCRIPTION OF THE DRAWINGS

The present invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

The present invention is directed to a printing system in which various types of media can be printed upon, including labels (with gaps or I-marks) continuous plastic (both clear and colored, with I-marks), and plastic bags (both clear and colored, with perforations), and a printing system in which gaps, I-marks and perforations can be registered.

The printing system includes a gap/I-mark detection system 10 which is selectable between various modes of operation. In a first mode of operation, the gap/I-mark detection system operates to register gaps for a translucent media. In a second mode of operation, the detection system operates to register I-marks for a translucent media. The translucent media may include label stock and colored plastic. A third mode of operation is provided to register I-marks for a transparent media, such as clear plastic.

Figure 1:
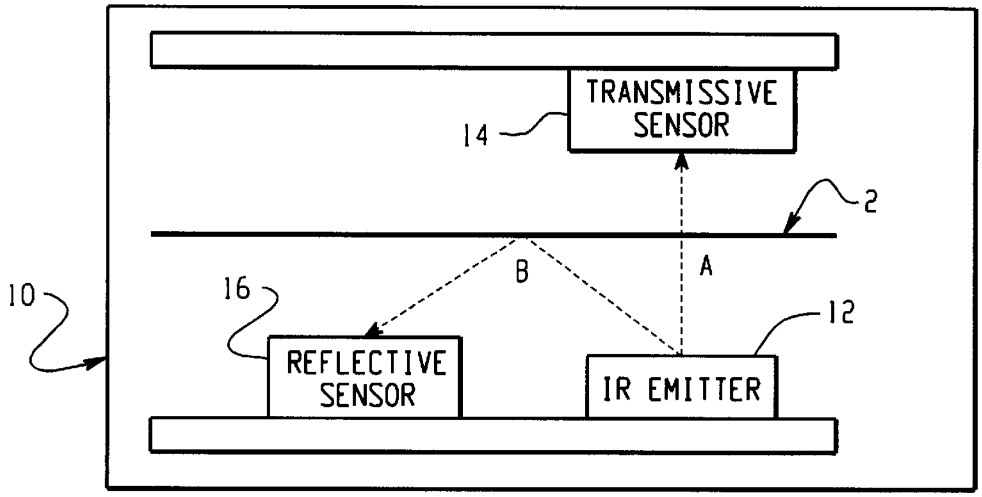
FIG. 1 is a diagram of a system for detecting gaps and I-marks on various types of media.

Referring now to the drawings wherein the showings are for the purposes of illustrating a preferred embodiment of the invention only and not for purposes of limiting same, FIG. 1 shows a gap/I-mark detection system 10 for detecting gaps and I-marks on various media. Gap/I-mark detection system 10 is generally comprised of an IR emitter 12, a transmissive sensor 14, and a reflective sensor 16. IR emitter 12 passes light through media 2 as it moves through detection system 10. It should be appreciated that IR emitter 12 is suitably replaced by other types of emitters emitting visible or non-visible light.

In the first mode of operation, transmissive sensor 14 is used to register a gap on a translucent media, such as label stock. In this respect, transmissive sensor 14 detects the amount of light passing through media 2. When the amount of light passing through media 2 reaches a threshold level, transmissive sensor 14 determines that a gap is present. In this regard, the amount of light passing through media 2 will increase when a gap is present. It should be noted that in this mode of operation reflective sensor 16 is inactive.

In the second mode of operation, reflective sensor 16 is used to register an I-mark on a translucent media, such as label stock. In this respect, reflective sensor 16 detects the change in reflectance when a printed I-mark is present. In this regard, the amount of reflectance from the light transmitted by IR emitter 12 will decrease when the printed I-mark on media 2 passes through detection system 10. It should be appreciated that in the second mode of operation transmissive sensor 14 is active to detect an "out-of-paper" condition. Therefore, transmissive sensor 14 detects an increase in the level of light in the absence of media 2, and generates an "out-of-paper" condition, causing printing operations to halt.

As noted above, prior art printing systems use the transmissive sensor to detect an "out-of-paper" condition when the reflective sensor is being used to register an I-mark. Therefore, printing on a transparent media cannot be carried out since the transmissive sensor detects an "out-of-paper" condition, due to the passing of light through the media from the IR emitter to the transmissive sensor.

To address the foregoing problem, the present invention provides a third mode of operation, where gap/I-mark detection system 10 operates to register I-marks on a transparent media, such as clear plastic. In this mode of operation, reflective sensor 16 is disconnected, and the inputs originally connected to reflective sensor 16 (i.e., I-mark detector) are connected to transmissive sensor 14, replacing the original inputs to transmissive sensor 14. Therefore, in the third mode of operation, reflective sensor 16 is inactive, and transmissive sensor 14 is active. Accordingly, when an I-mark moves past transmissive sensor 14, a decrease in the amount of light reaching transmissive sensor 14 from IR emitter 12 will be detected. Consequently, an I-mark will be detected. It should be appreciated that since the original inputs to transmissive sensor 14 are disconnected, no "out-of-paper" condition is detected.

Figure 2:
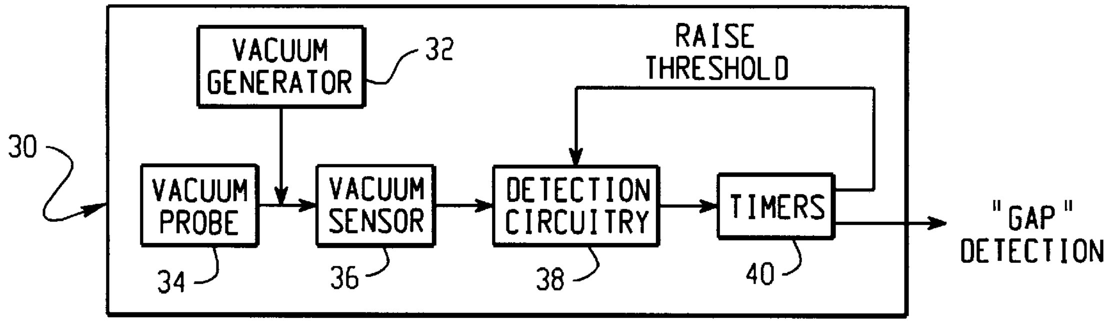
FIG. 2 is a block diagram of a perforation detection system according to a preferred embodiment of the present invention.
Figure 6:
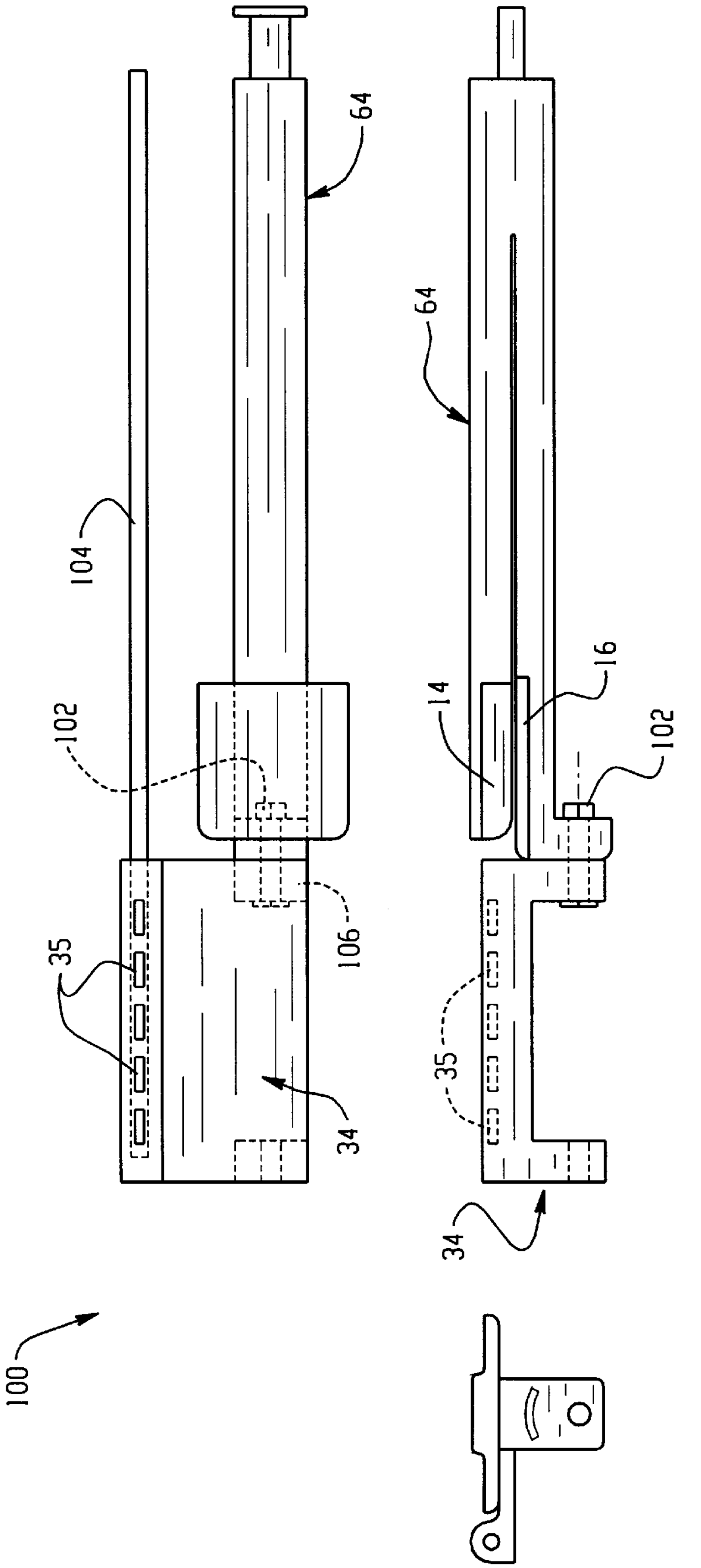
FIG. 6 shows a vacuum probe assembly according to a preferred embodiment of the present invention.

In a fourth mode of operation, the printing system operates to register perforations for bags (e.g., clear or colored plastic bags). For this operating mode, a perforation detection system 30 is provided. Perforation detection system 30 will now be described with reference to FIG. 2. In this mode of operation, transmissive sensor 14 and reflecting sensor 16 are disconnected, and thus both are inactive. Perforation detection system 30 is generally comprised of a vacuum generator 32, a vacuum probe 34, a vacuum sensor 36, detection circuitry 38 and timers 40. Vacuum generator 32 is preferably a small AC-powered vacuum pump which provides a vacuum supply. The vacuum supply is routed to vacuum probe 34 having small slits 35, as best seen in FIG. 6 discussed below. As perforated bags pass over the vacuum probe slits, vacuum sensor 36 will detect changes in the vacuum. In this regard, when no perforation is over vacuum probe slits 35, the vacuum generated by vacuum generator 32 draws the bag against the vacuum probe slits to form a seal. As a result, vacuum sensor 36 registers a full vacuum. It should be noted that a tension control system may be used with the bags to provide an improved seal with the probe slits. When a perforation passes over the vacuum probe slits, the vacuum seal is broken, and consequently air rushes in, reducing the vacuum. As a result, vacuum sensor 36 registers a reduced vacuum. Vacuum sensor 36 signals the changes in the vacuum level to detection circuitry 38. It should be appreciated that the output signal of vacuum sensor 36 characteristically has a sharp rising edge when a perforation is present, as will be discussed below. Detection circuitry 38 includes a voltage comparator, for comparing the voltage of the output signal from vacuum sensor 36 to a threshold voltage. When the output signal is greater than the threshold voltage, the output of detection circuitry 38 changes state to trigger timers 40. Timers 40 consist of two timers. The first timer is connected to the inputs which have been disconnected from transmissive sensor 14. Accordingly, the first timer sends a signal simulating a "gap" detection signal. The second timer is used for temporarily raising the threshold voltage for detecting a perforation. Accordingly, the second timer is used to prevent the generation of further "gap" detection signals for a predetermined period of time. In this regard, due to the extreme sensitivity of the printer to gap detection signals, the gap detection circuitry output signal can sometimes result in several "gap" detection signals for the same perforation.

Figure 3:
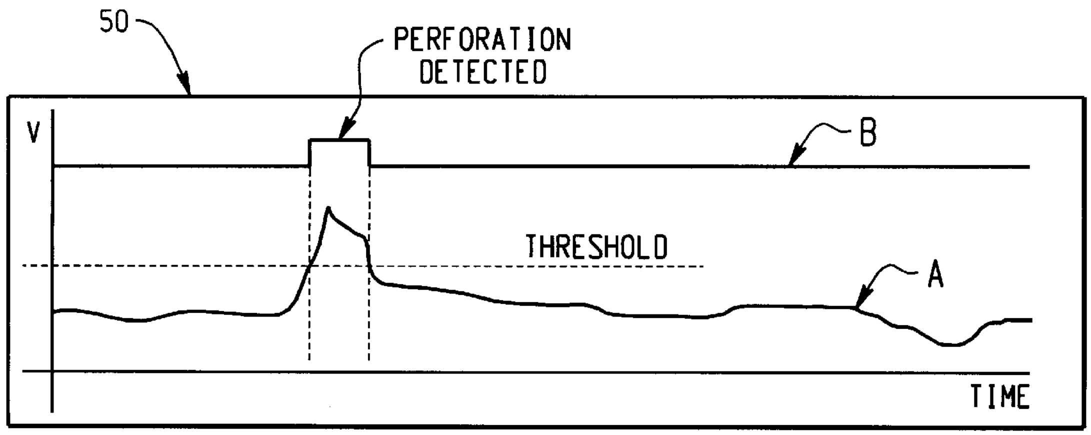
FIG. 3 is a timing diagram of the output of a vacuum sensor of the perforation detection system shown in FIG. 2.

Referring now to FIG. 3, there is shown a timing diagram 50 showing an unfiltered vacuum sensor output signal A and a detection circuitry output signal B. As can be seen, output signal A of vacuum sensor 36 has some variance as the perforated bag passes over the slits of vacuum probe 34. However, as noted above, the output signal generated by the presence of a perforation is very sharp. Unfiltered output signal A is coupled through a capacitor to eliminate the DC component of the output signal. Output signal B of detection circuitry 38 is a much cleaner signal having a sharper, more defined transition when a perforation is present.

Figure 4:
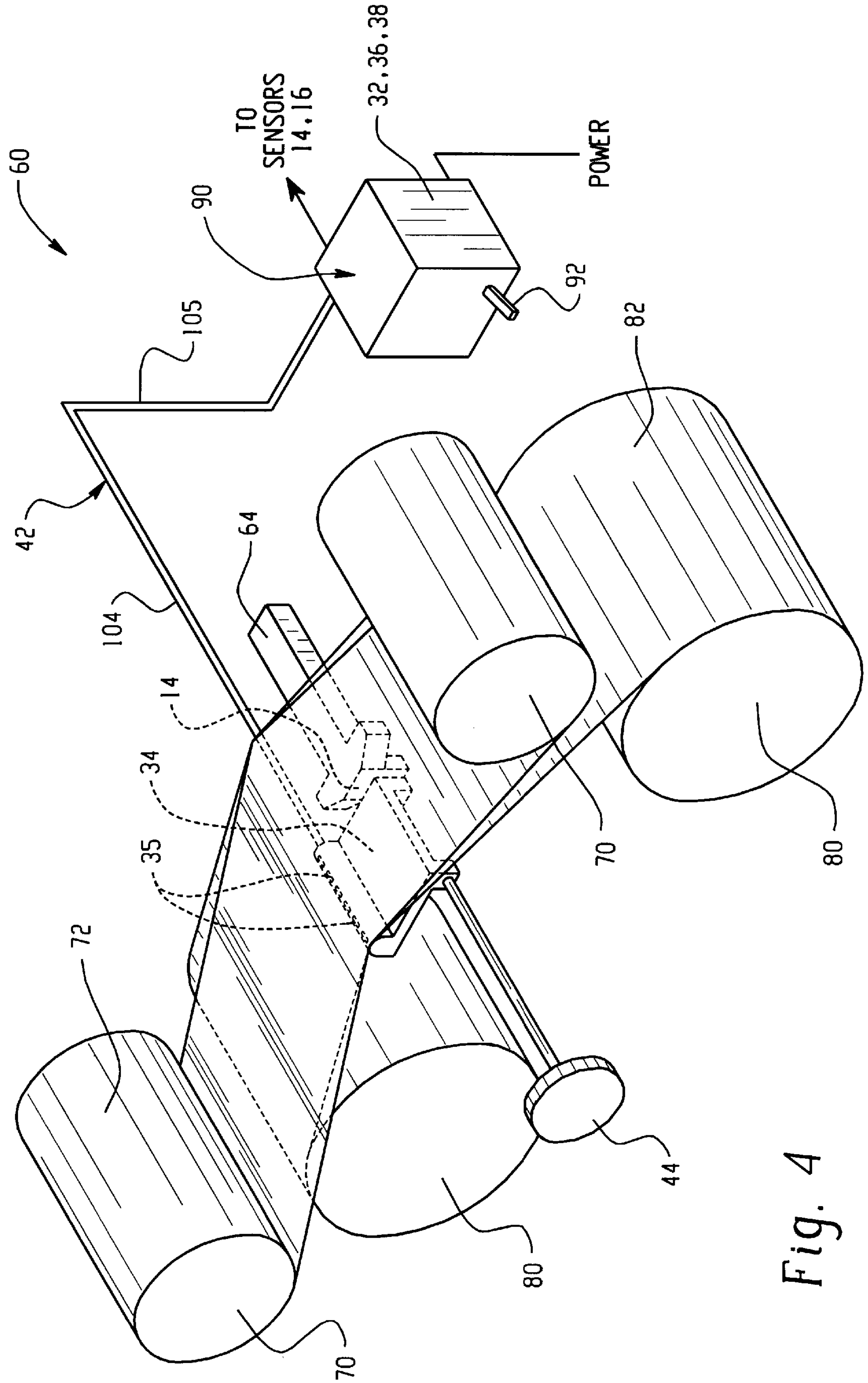
FIG. 4 is a perspective view of the printing system according to a preferred embodiment of the present invention.
Figure 5:
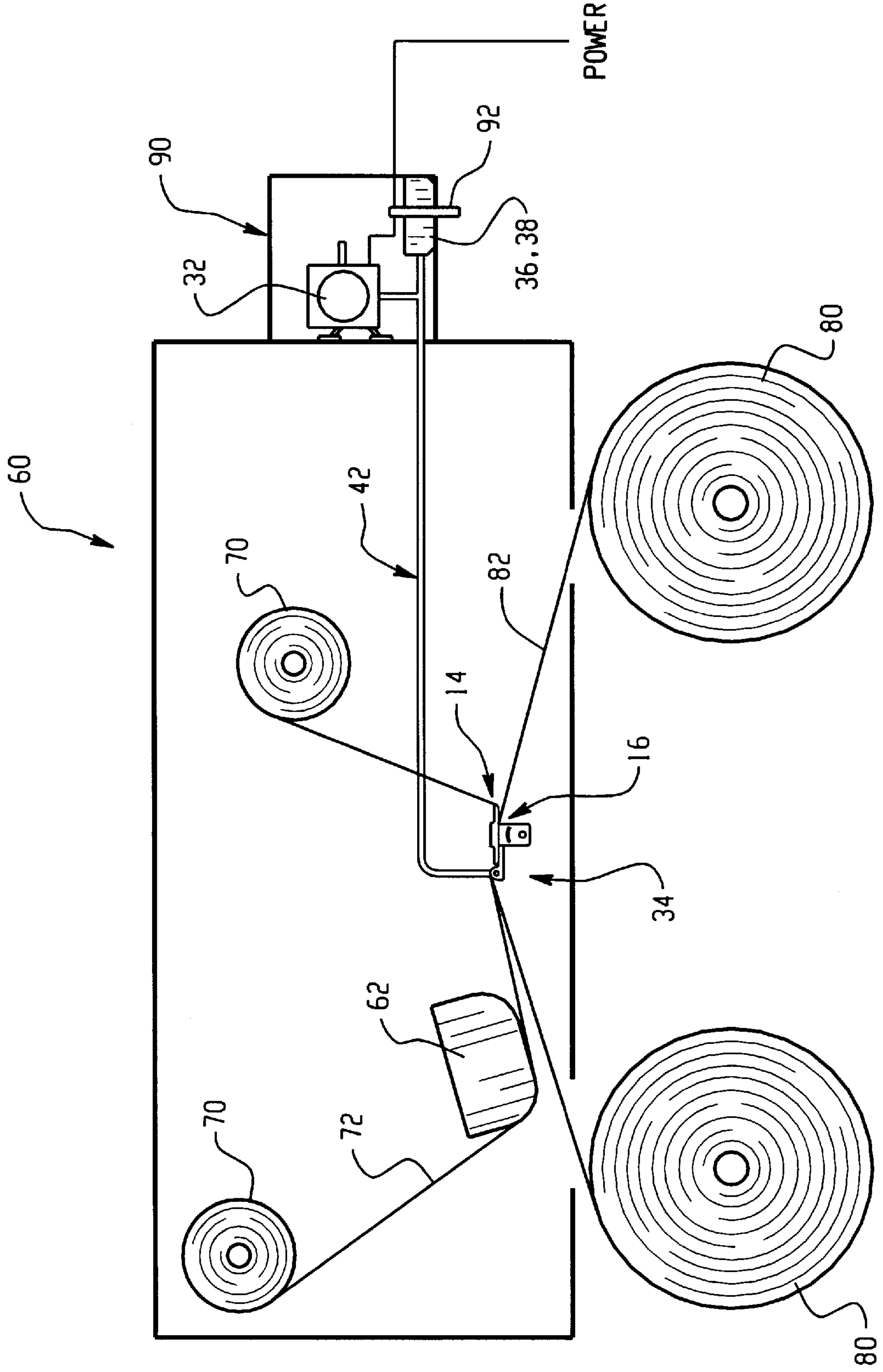
FIG. 5 is a side view of the printing system shown in FIG. 4.

Reference is now made to FIGS. 4 and 5, where the physical arrangement of printing system 60 having the features discussed above is shown in detail. It should be appreciated that printing system 60 may take the form of a modified prior art printing system, such as a TEC B-x72. Printing system 60 includes a rotary print ribbon mechanism 70 for advancing a print ribbon 72, and a rotary power wind/unwind mechanism 90 for advancing a media 82. The wind/unwind mechanism 90 enables the media arranged on a roll to be rewound to its original orientation after printing is completed. This is particularly useful in the case of plastic bags, where the printed bags must be arranged to be acceptable to a bagging machine. Printing system 60 also includes vacuum probe 34 having vacuum pickup slots 35. The position of vacuum probe 34 is adjusted by a lateral adjustment screw 44. Rotary power unwind/rewind mechanism 70 carries media 82 over vacuum probe 34. Vacuum probe 34 is connected to vacuum generator 32 and vacuum sensor 36 via a vacuum line 42. It should be appreciated that vacuum line 42 is connected to vacuum probe 34 at a position where media 82 passes over vacuum probe 34. Vacuum line 42 includes a brass tubing 104 and plastic tubing 105. Printing system 60 also includes a print head 62 (FIG. 5) and a paper gap sensor 64 including transmissive sensor 14 and reflective sensor 16. A housing 90 houses vacuum generator 32, vacuum sensor 36, detection circuitry 38, and a multi-position switch 92 for selecting the various operating modes discussed above.

Referring now to FIG. 6, there is shown a vacuum probe assembly 100. Vacuum probe assembly 100 is generally comprised of vacuum probe 34 and paper gap sensor 64. Brass tubing 104 provides a connection between vacuum probe 34 and plastic tubing 105. A staking bushing 106 and a bowed E-ring 102 connect vacuum probe 34 to paper gap sensor 64.

Figure 7:
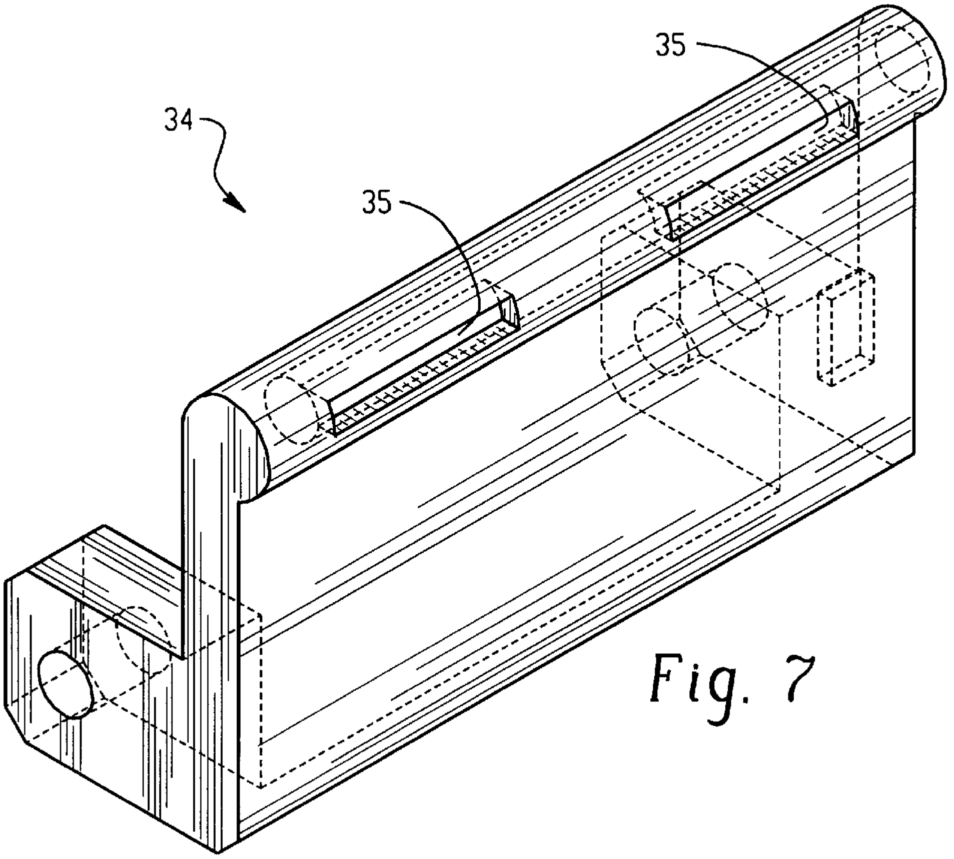
FIG. 7 shows a vacuum probe according to a preferred embodiment of the present invention.
Figure 8:
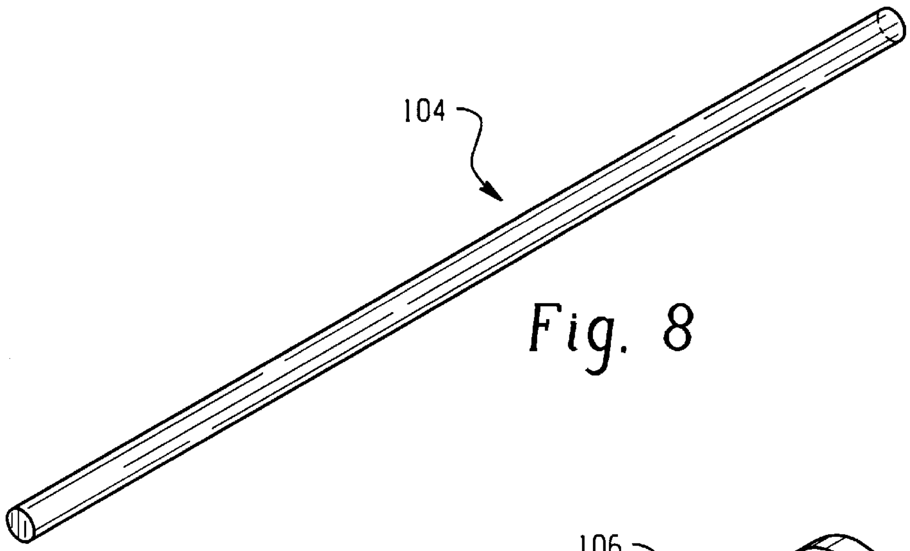
FIG. 8 shows a brass tubing according to a preferred embodiment of the present invention.
Figure 9:
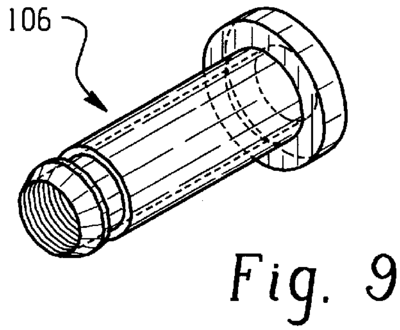
FIG. 9 shows a staking bushing according to a preferred embodiment of the present invention.

A detailed view of vacuum probe 34, including dimensions and tolerances, is shown in FIG. 7. A detailed view of brass tubing 104, including dimensions and tolerances, is shown in FIG. 8. FIG. 9 provides a detailed view of staking bushing 106, including dimensions and tolerances.

The present invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A system for registering perforations formed in a sheet media, comprising:

vacuum generation means for generating a vacuum;

sensing means for sensing a vacuum level;

media advancement means for advancing the sheet media across the sensing means; and detection means for receiving the vacuum level from the sensing means and detecting the presence of a perforation when the vacuum level reaches a predetermined threshold level.

2. A system as defined in claim 1, wherein said sensing means includes probe means having one of more slits for receiving said vacuum, said sheet media drawn towards the slits by said vacuum.

3. A system as defined in claim 2, wherein said sensing means further includes a sensor for detecting the vacuum level of the vacuum at the slits, and providing a signal indicative of the vacuum level to said detection means.

4. A system as defined in claim 3, wherein said detection means includes comparison means for comparing the received vacuum level signal to the predetermined threshold level.

5. A system as defined in claim 1, wherein said system further comprises timer means, said timer means generating a first signal in response to detection of a perforation by said detection means, wherein said first signal results in the registration of a perforation.

6. A system as defined in claim 5, wherein said timer means generates a second signal in response to detection of a perforation by said detection means, wherein said second signal prevents generation of said first signal for the same perforation.

7. A method for registering perforations in a printing system comprising:

advancing a sheet media through the printing system;

generating a vacuum to draw the sheet media to form a seal, wherein said sheet media includes at least one perforation;

continuously sensing a vacuum level as the sheet media advances through the printing system; and detecting the at least one perforation in accordance with the sensed vacuum level.

8. A method as defined in claim 7, wherein the step of generating a vacuum includes:

drawing the vacuum through one or more slits, said sheet media advancing across said slits and drawn thereto by said vacuum.

9. A method as defined in claim 7, wherein said step of continuously sensing the level of the vacuum includes the step of providing a signal indicative of the vacuum level.

10. A method as defined in claim 7, wherein said step of detecting a perforation includes the step of comparing the sensed vacuum level to a predetermined threshold level to detect a perforation.

11. A method as defined in claim 7, wherein said method further comprises generating a first signal in response to detection of a perforation, wherein said first signal results in registration of the perforation.

12. A method as defined in claim 11, wherein said method further comprises generating a second signal in response to detection of a perforation, wherein said second signal prevents generation of the first signal for the same perforation.

13. A method for registering a contrasting mark formed on a generally transparent sheet media as the sheet media moves through a printing system, the method comprising:

sensing the transmittancy of the sheet media;

advancing the sheet media through the printing system;

detecting a contrasting mark in accordance with the sensed transmittancy of the sheet media, and registering the contrasting mark in response thereto.

14. A method as defined in claim 7, wherein the step of detecting the at least one perforation in accordance with the sensed vacuum level detects a perforation when the vacuum level decreases by at least a predetermined amount.

15. A method as defined in claim 7, wherein the step of detecting the at least one perforation in accordance with the sensed vacuum level detects a perforation when the vacuum level changes by at least a predetermined amount.

16. A method as defined in claim 13, wherein said step of detecting a contrasting mark in accordance with the sensed transmittance of the sheet media detects the contrasting mark when the sensed transmittancy of the sheet media decreases by at least a predetermined amount.

* * * * *